(12) United States Patent
Takayama et al.

(10) Patent No.: US 10,913,868 B2
(45) Date of Patent: Feb. 9, 2021

(54) AQUEOUS COATING COMPOSITION

(71) Applicant: KANSAI PAINT CO., LTD., Hyogo (JP)

(72) Inventors: Daisuke Takayama, Kanagawa (JP); Hironori Tonomura, Kanagawa (JP); Naoto Matsushima, Kanagawa (JP); Shuichi Nakahara, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 15/545,468

(22) PCT Filed: Dec. 10, 2015

(86) PCT No.: PCT/JP2015/084682
§ 371 (c)(1),
(2) Date: Jul. 21, 2017

(87) PCT Pub. No.: WO2016/121242
PCT Pub. Date: Aug. 4, 2016

(65) Prior Publication Data
US 2017/0355863 A1 Dec. 14, 2017

(30) Foreign Application Priority Data
Jan. 29, 2015 (JP) ................................. 2015-015658

(51) Int. Cl.
| | | |
|---|---|---|
| *C09D 7/45* | (2018.01) | |
| *B05D 7/00* | (2006.01) | |
| *C08K 3/32* | (2006.01) | |
| *C09D 7/40* | (2018.01) | |
| *C09D 133/00* | (2006.01) | |
| *C09D 5/02* | (2006.01) | |
| *C08F 265/06* | (2006.01) | |
| *C09D 151/00* | (2006.01) | |
| *C09D 167/00* | (2006.01) | |
| *C09D 5/00* | (2006.01) | |
| *C08F 220/14* | (2006.01) | |
| *C09D 157/10* | (2006.01) | |

(52) U.S. Cl.
CPC ................. *C09D 7/45* (2018.01); *B05D 7/52* (2013.01); *C08F 220/14* (2013.01); *C08F 265/06* (2013.01); *C09D 5/00* (2013.01); *C09D 5/002* (2013.01); *C09D 5/02* (2013.01); *C09D 7/40* (2018.01); *C09D 133/00* (2013.01); *C09D 151/003* (2013.01); *C09D 157/10* (2013.01); *C09D 167/00* (2013.01); *B05D 7/50* (2013.01); *B05D 2201/00* (2013.01); *C08K 2003/329* (2013.01)

(58) Field of Classification Search
CPC ............. C09D 133/062; C09D 133/12; C09D 151/00; B05D 7/572; B05D 2451/00; B05D 7/14; C08G 63/137; C08F 265/06; B32B 27/18; C08L 33/066; C08L 67/02; C08K 3/32; C08K 2003/329
See application file for complete search history.

(56) References Cited

U.S. PATENT DOCUMENTS

| | | | | |
|---|---|---|---|---|
| 4,350,535 A | * | 9/1982 | Ishijima | ............... C09D 17/006 106/403 |
| 5,466,286 A | * | 11/1995 | Briselli | .................... C09D 5/38 106/403 |
| 5,496,901 A | * | 3/1996 | DeSimone | ............. B05D 1/025 526/245 |
| 8,906,507 B2 | * | 12/2014 | Campbell | .............. B05D 7/576 428/423.1 |
| 2006/0052493 A1 | | 3/2006 | Nagano et al. | |
| 2009/0004487 A1 | | 1/2009 | Katsuta et al. | |
| 2009/0130322 A1 | | 5/2009 | Nagano et al. | |
| 2011/0111242 A1 | * | 5/2011 | Tomizaki | ................. B05D 7/14 428/482 |
| 2011/0135936 A1 | * | 6/2011 | Katsuta | ............. C09D 133/066 428/423.1 |

FOREIGN PATENT DOCUMENTS

| | | |
|---|---|---|
| CN | 101250368 | 8/2008 |
| CN | 101292002 | 10/2008 |

(Continued)

OTHER PUBLICATIONS

International Search Report dated Jan. 26, 2016 in International (PCT) Application No. PCT/JP2015/084682.
Office Action dated Jan. 22, 2019 in corresponding Chinese patent application No. 201580074850.9, with Machine English Translation.

* cited by examiner

Primary Examiner — Francisco W Tschen
(74) Attorney, Agent, or Firm — Wenderoth, Lind & Ponack, L.L.P.

(57) ABSTRACT

The problem to be solved by the present invention is to provide an aqueous coating composition that can form a multilayer coating film having excellent storage stability, excellent adhesion to plastic base materials, excellent finish, and excellent coating film performance, such as water resistance; and to also provide a coating method using the composition. The present invention provides an aqueous coating composition comprising (A) an aqueous dispersion of a modified polyolefin, (B) an aqueous acrylic resin and/or an aqueous polyester resin, and (C) a phosphoric acid compound represented by a specific formula; and also provides a method for forming a coating film, comprising applying the aqueous coating composition, as well as an article coated with the aqueous coating composition.

18 Claims, No Drawings

(56) References Cited

FOREIGN PATENT DOCUMENTS

| | | |
|---|---|---|
| JP | 10-296171 | 11/1998 |
| JP | 2003-183563 | 7/2003 |
| JP | 2004-331911 | 11/2004 |
| JP | 2006-7006 | 1/2006 |
| JP | 2007-70370 | 3/2007 |
| JP | 2007-302709 | 11/2007 |
| JP | 2009-30020 | 2/2009 |
| WO | 2007/066827 | 6/2007 |
| WO | 2010/016617 | 2/2010 |

AQUEOUS COATING COMPOSITION

TECHNICAL FIELD

Cross Reference of Related Application

This application claims priority to Japanese Patent Application No. 2015-015658, filed on Jan. 29, 2015, the disclosure of which is incorporated herein by reference in its entirety. The present invention relates to an aqueous coating composition for vehicles, comprising a phosphoric acid compound, the aqueous coating composition having excellent storage stability, excellent adhesion to plastic base materials, an excellent finished appearance, and excellent coating film performance, such as water resistance.

BACKGROUND ART

Many plastic-molded products, such as polyolefin, are used as vehicle exterior panels, electrical home appliances, and other members. Such molded products are often previously coated with a primer containing a chlorinated polyolefin etc. in order to increase the adhesion between top coating films and the molded products. Aromatic organic solvents, such as toluene and xylene, have been used as such primers, in tams of the solubility of chlorinated polyolefins; however, from the viewpoint of safety and hygiene, environmental protection, etc., making primers aqueous has been promoted in recent years.

As aqueous primers, for example, PTL 1 and PTL 2 propose compositions comprising a specific ratio of at least one aqueous resin selected from aqueous polyolefin resins, aqueous polyurethane resins, and aqueous acrylic resins, and a crosslinking agent, for the purpose of forming coating films having excellent adhesion to plastic-molded products, such as polyolefin.

Further, as coating methods, for example, PTL 3 and PTL 4 propose a 3-coat 1-bake process, which comprises top coating wherein a colored base coating composition and a clear coating composition are sequentially applied after coating of an aqueous primer. When an aqueous primer is used in such a wet-on-wet process, in terms of the finish after coating of a top coating composition, it is necessary to vaporize volatile components (mainly the solvent (water)) in the uncured primer coating film by preliminary drying (preheating) after coating of the aqueous primer and before the subsequent coating step.

However, in practical coating lines, omitting the preheating step and reducing the baking temperature is required, in terms of space saving and energy saving. When the film thickness of the primer is reduced so as to facilitate drying for this purpose, poor finished appearance due to defective film formation occur, depending on booth environment (particularly low-humidity conditions, such as a relative humidity of 65% or less). Moreover, there are problems such that film formation is problematic, and conductivity cannot be ensured. Furthermore, for multilayer coating films, it was difficult to omit the preheating step, in terms of, not only finish after top coating, but also coating film performance, such as water resistance.

Accordingly, the present applicant proposed in PTL 5 that when an aqueous primer composition comprising specific amounts of an aqueous dispersion of a modified polyolefin, an aqueous urethane resin and/or an aqueous acrylic resin, and a specific diester compound is used, a multilayer coating film having excellent finish or water resistance can be formed without the formation of a mixed layer, even when the subsequent step of applying a top coating composition is performed without preheating after coating of the aqueous primer composition.

CITATION LIST

Patent Literature

PTL 1: WO2007/066827
PTL 2: JP2007-302709A
PTL 3: JPH10-296171A
PTL 4: JP2004-331911A
PTL 5: WO2010/016617

SUMMARY OF INVENTION

Technical Problem

However, even the aqueous primer composition disclosed in PTL 5 may result in a thick primer coating film. When an aqueous base coating composition was used as a top coating composition, some of the resulting multilayer coating films had reduced water resistance, depending on the type of aqueous base coating composition.

Therefore, an object of the present invention is to provide an aqueous coating composition that can form a multilayer coating film having excellent storage stability, excellent adhesion to plastic base materials, excellent finish, and excellent coating film performance, such as water resistance; and to also provide a coating method using the composition.

Solution to Problem

The present inventors conducted extensive research to achieve the above object, and consequently found that the above object can be achieved by an aqueous coating composition comprising (A) an aqueous dispersion of a modified polyolefin, (B) an aqueous acrylic resin and/or an aqueous polyester resin, and (C) a phosphoric acid compound represented by a specific formula. Thus, the present invention has been completed.

Specifically, the present invention provides an aqueous coating composition for vehicles, comprising (A) an aqueous dispersion of a modified polyolefin, (B) an aqueous acrylic resin and/or an aqueous polyester resin, and (C) a phosphoric acid compound represented by Formula (1) below:

$$[R^1O(R^2O)_n]_m-\overset{O}{\underset{\|}{P}}-(OH)_{3-m} \quad (1)$$

wherein m is 1 or 2, n is 0 or an integer of 1 to 20,
$R^1$ is substituted or unsubstituted hydrocarbon having 2 or more and 20 or less carbon atoms,
when m is 2, each $R^1$ may be the same or different,
$R^2$ is $C_{2-4}$ alkylene,
when n is 2 or more, n number of oxyalkylene units ($R^2O$) may be the same or different, and
when m is 2, each $(R^2O)_n$ may be the same or different.

The present invention also provides a method for forming a coating film, the method comprising applying the aqueous coating composition.

The present invention also provides an article coated with the aqueous coating composition.

Advantageous Effects of Invention

The aqueous coating composition for vehicles of the present invention comprises (A) an aqueous dispersion of a modified polyolefin, (B) an aqueous acrylic resin and/or an aqueous polyester resin, and (C) a phosphoric acid compound represented by a specific formula. In particular, the main characteristic is that the aqueous coating composition comprises (C) a phosphoric acid compound represented by a specific formula as a component that serves as a surfactant and a curing catalyst.

Such a phosphate compound as the component (C) is a compound having a phosphate group and a hydrocarbon group, and preferably further having a (poly)oxyalkylene group. Because of such a molecular structure, this compound has the action as an acid compound derived from the phosphate group, and also has the action as a surfactant due to the combined use of the phosphate group, which is a hydrophilic group (preferably a (poly)oxyalkylene group, which is a nonionic group), and the hydrocarbon group, which is a hydrophobic group.

Owing to the specific feature of the phosphoric acid compound (C), the aqueous coating composition of the present invention, which comprises the aqueous dispersion of a modified polyolefin (A), the aqueous acrylic resin and/or aqueous polyester resin (B), and the phosphoric acid compound (C) as constituents, has excellent storage stability and exhibits wettability, viscosity development, and like effects, and thus has an excellent finished appearance (smoothness and distinctness of image). Furthermore, the phosphate group contributes to the adhesion to plastic base materials, and curability is improved by the catalytic effect; thus, there is an effect such that a coating film having excellent coating film performance, such as water resistance, can be obtained.

DESCRIPTION OF EMBODIMENTS

The aqueous coating composition for vehicles of the present invention is described in more detail below.

The aqueous coating composition for vehicles of the present invention (hereinafter also abbreviated as "the present coating composition") comprises (A) an aqueous dispersion of a modified polyolefin, (B) an aqueous acrylic resin and/or an aqueous polyester resin, and (C) a phosphoric acid compound represented by Formula (1) below:

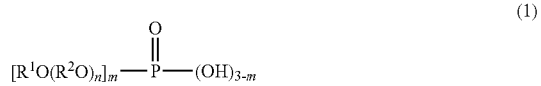

(1)

wherein m is 1 or 2, n is 0 or an integer of 1 to 20,
$R^1$ is substituted or unsubstituted hydrocarbon having 2 or more and 20 or less carbon atoms,
when m is 2, each $R^1$ may be the same or different,
$R^2$ is $C_{2-4}$ alkylene,
when n is 2 or more, n number of oxyalkylene units ($R^2O$) may be the same or different, and
when m is 2, each $(R^2O)_n$ may be the same or different.

Aqueous Dispersion of Modified Polyolefin (A)

The aqueous dispersion of a modified polyolefin (A) used in the present invention is formed by dispersing a polyolefin (i) modified with an unsaturated carboxylic acid or an acid anhydride thereof (hereinafter also referred to as the "unsaturated carboxylic acid- or acid anhydride-modified polyolefin (i)") in an aqueous medium.

The unsaturated carboxylic acid- or acid anhydride-modified polyolefin (i) can be obtained by, for example, obtaining a polyolefin by (co)polymerizing at least one olefin selected from $C_{2-10}$, particularly $C_{2-4}$, olefin compounds, such as ethylene, propylene, butylene, and hexene; and further graft-polymerizing the polyolefin using a $C_{3-10}$, particularly $C_{4-8}$, unsaturated carboxylic acid (preferably unsaturated mono- or dicarboxylic acid), such as (meth)acrylic acid, maleic acid, fumaric acid, or itaconic acid, or an anhydride of such an unsaturated carboxylic acid, by a known method.

The unsaturated carboxylic acid- or acid anhydride-modified polyolefin (i) is preferably one that is modified with a maleic acid or an acid anhydride thereof. The amount of the unsaturated carboxylic acid or acid anhydride thereof for grafting is not strictly limited, and may vary according to the properties etc. required of the resulting coating film; the amount is preferably in the range of generally 1 to 20 mass %, particularly 1.5 to 15 mass %, and more particularly 2 to 10 mass %, based on the solids mass of polyolefin.

The unsaturated carboxylic acid- or acid anhydride-modified polyolefin (i) may be further acrylic modified, as necessary. Examples of polymerizable unsaturated monomers that can be used for acrylic modification include alkyl esters of (meth)acrylic acid, such as methyl (meth)acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, lauryl (meth)acrylate, and stearyl (meth)acrylate; acrylic monomers, such as (meth)acrylic acid, glycidyl (meth)acrylate, 2-hydroxyethyl (meth)acrylate, (meth)acrylamide, and (meth)acrylonitrile; styrene; etc. These can be used singly or in a combination of two or more.

In the present specification, the term "(meth)acrylic" means acrylic or methacrylic, and the term "(meth)acrylate" means acrylate or methacrylate.

Examples of the acrylic modification method include a method comprising first reacting the unsaturated carboxylic acid- or acid anhydride-modified polyolefin with (meth)acrylic acid glycidyl or the like that is reactive with the carboxyl groups of the modified polyolefin to introduce a polymerizable unsaturated group, and then copolymerizing at least one other monomer with the unsaturated carboxylic acid- or acid anhydride-modified polyolefin into which a polymerizable unsaturated group is introduced. The amount of the polymerizable unsaturated monomer used in acrylic modification is preferably in the range of 30 mass % or less, particularly 0.1 to 20 mass %, and more particularly 0.15 to 15 mass %, based on the solids mass of the resulting unsaturated carboxylic acid- or acid anhydride-modified polyolefin (i), in terms of the compatibility with other components, the adhesion of the resulting coating film, etc.

Moreover, the unsaturated carboxylic acid- or acid anhydride-modified polyolefin (i) may be modified with a compound having a polyoxyalkylene chain, if necessary, in tams of the water resistance, finish, gasohol resistance, etc., of the resulting coating film. Examples of the polyoxyalkylene chain in the compound having a polyoxyalkylene chain include a polyoxyethylene chain, a polyoxypropylene chain, and a blocked chain of polyoxyethylene and polyoxypropylene.

It is preferable that the compound having a polyoxyalkylene chain has a number average molecular weight of generally 400 to 3000, and particularly 500 to 2000. If the number average molecular weight is less than 400, the effect as a hydrophilic group cannot be sufficiently exhibited. Further, the coating film performance (particularly water resistance) may be adversely affected. On the other hand, if the number average molecular weight is greater than 3000, solidification may occur at room temperature, deteriorating solubility, and handling may be difficult.

Further, the unsaturated carboxylic acid- or acid anhydride-modified polyolefin (i) may be chlorinated, if necessary. The polyolefin can be chlorinated, for example, by blowing chlorine gas into an organic solvent solution or dispersion of the polyolefin or a modified product thereof. The reaction temperature can be set in the range of 50 to 120° C. The chlorine content of the chlorinated polyolefin (solids content) can vary depending on the physical properties etc. required of the chlorinated polyolefin; however, in terms of the adhesion of the resulting coating film etc., the chlorine content is preferably in the range of generally 35 mass % or less, particularly 10 to 30 mass %, and more particularly 12 to 25 mass %, based on the mass of the chlorinated polyolefin.

The polyolefin used in the unsaturated carboxylic acid- or acid anhydride-modified polyolefin (i) is particularly preferably one containing propylene as a polymerization unit. The mass fraction of propylene in the unsaturated carboxylic acid- or acid anhydride-modified polyolefin (i) is preferably in the range of generally 0.5 to 0.99, particularly 0.6 to 0.97, and more particularly 0.7 to 0.95, in terms of the compatibility with other components, the adhesion of the resulting coating film, etc.

The unsaturated carboxylic acid- or acid anhydride-modified polyolefin (i) obtained in the above manner preferably has a weight average molecular weight (Mw) of generally 30000 to 180000, particularly 50000 to 150000, and more particularly 70000 to 120000. If the weight average molecular weight of the modified polyolefin is outside of this range, the compatibility with other components, the interlayer adhesion between the resulting coating film and the base material or top coating film layer, etc., may be reduced.

The weight average molecular weight and number average molecular weight of the unsaturated carboxylic acid- or acid anhydride-modified polyolefin (i) are values calculated from the weight average molecular weight and number average molecular weight as determined by gel permeation chromatography based on the weight average molecular weight and number average molecular weight of polystyrene. Specifically, the values are obtained from measurement with "HLC/GPC 150C" (trade name, produced by Water Inc.; 60 cm×1) with a column temperature of 135° C. using o-dichlorobenzene as a solvent and at a flow rate of 1.0 mL/min. The injection sample is prepared by dissolving the modified polyolefin in o-dichlorobenzene at 140° C. for 1 to 3 hours to a solution concentration of 5 mg of modified polyolefin per 3.4 mL of o-dichlorobenzene. Examples of columns for gel permeation chromatography include "GMH$_{HR}$-H(S)HT" (trade name, produced by Tosoh Corporation).

The aqueous dispersion of a modified polyolefin (A) used in the present invention can be obtained by dispersing the unsaturated carboxylic acid- or acid anhydride-modified polyolefin (i) in an aqueous medium, such as deionized water. In this case, dispersion in water can be performed by, if necessary, neutralizing part or all of the carboxyl groups of the unsaturated carboxylic acid- or acid anhydride-modified polyolefin (i) with an amine compound and/or using an emulsifier. When the unsaturated carboxylic acid- or acid anhydride-modified polyolefin (i) has a polyoxyalkylene chain, the unsaturated carboxylic acid- or acid anhydride-modified polyolefin (i) can be dispersed in an aqueous medium, without using an amine compound and/or an emulsifier, or by using a small amount of an amine compound and/or an emulsifier.

Examples of amine compounds include tertiary amines, such as triethylamine, tributylamine, dimethylethanolamine, and triethanolamine; secondary amines, such as diethylamine, dibutylamine, diethanolamine, and morpholine; primary amines, such as propylamine and ethanolamine; etc.

The amount of such an amine compound, when used, is preferably in the range of generally 0.1 to 1.0 molar equivalent relative to the carboxyl groups of the unsaturated carboxylic acid- or acid anhydride-modified polyolefin (i).

Examples of emulsifiers include nonionic emulsifiers, such as polyoxyethylene monooleyl ether, polyoxyethylene monostearyl ether, polyoxyethylene monolauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, polyoxyethylene sorbitan monolaurate, etc.; anionic emulsifiers, such as sodium salts and ammonium salts of alkylsulfonic acids, alkylbenzenesulfonic acids, and alkylphosphoric acids; and the like. Also usable are polyoxyalkylene group-containing anionic emulsifiers having an anionic group and a polyoxyalkylene group, such as a polyoxyethylene group or a polyoxypropylene group, per molecule; reactive anionic emulsifiers having such an anionic group and a polymerizable unsaturated group per molecule, etc. These can be used singly or in a combination of two or more.

The amount of such an emulsifier used is preferably in the range of generally 30 parts by mass or less, and particularly 0.5 to 25 parts by mass, based on 100 parts by mass of the solids mass of the unsaturated carboxylic acid- or acid anhydride-modified polyolefin (i).

Aqueous Acrylic Resin and/or Aqueous Polyester Resin (B)
Aqueous Acrylic Resin

Examples of the aqueous acrylic resin as the component (B) generally include a water-soluble acrylic resin having a weight average molecular weight of generally 5000 to 100000, preferably 5000 to 50000, or acrylic resin particles that serve as a dispersoid of an acrylic resin emulsion having a weight average molecular weight of 50000 or more, preferably 100000 or more, both of which being obtained by copolymerizing a monomer mixture of a hydrophilic group-containing polymerizable unsaturated monomer, such as a carboxy-containing polymerizable unsaturated monomer, and other polymerizable unsaturated monomers.

The weight average molecular weight and number average molecular weight of the aqueous acrylic resin are values calculated from the weight average molecular weight and number average molecular weight as determined by gel permeation chromatography using tetrahydrofuran as a solvent based on the weight average molecular weight and number average molecular weight of polystyrene. As the gel permeation chromatography apparatus, "HLC8120GPC" (trade name, produced by Tosoh Corporation) can be used. For gel permeation chromatography, four columns "TSKgel G-4000HxL," "TSKgel G-3000HxL," "TSKgel C-2500HxL," and "TSKgel G-2000HxL" (all produced by Tosoh Corporation) can be used.

In the present specification, the number average molecular weight of components other than the unsaturated carboxylic acid- or acid anhydride-modified polyolefin (i), for example, the number average molecular weight of a hydroxy-containing polyester resin, described later, is measured in the same manner as for the number average molecular weight of the aqueous acrylic resin described above.

Examples of the carboxy-containing polymerizable unsaturated monomer include (meth)acrylic acid, crotonic acid, maleic acid, fumaric acid, itaconic acid, and half-monoalkyl esterified products of dicarboxylic acids among these acids. Examples of hydrophilic group-containing polymerizable unsaturated monomers other than these carboxy-containing polymerizable unsaturated monomers include polyalkylene chain-containing polymerizable unsaturated monomers, such as polyethylene glycol (meth)acrylate, polypropylene glycol (meth)acrylate, methoxy polyethylene glycol (meth)acrylate, ethoxy polyethylene glycol (meth)acrylate, etc.; sulfonic acid group-containing polymerizable unsaturated monomers, such as 2-acrylamido-2-methylpropanesulfonic acid, 2-sulfoethyl (meth)acrylate, and like sulfoalkyl (meth)acrylates; tertiary amino group-containing polymerizable unsaturated monomers, such as N,N-dimethylaminoethyl (meth)acrylate and N,N-diethylaminoethyl (meth)acrylate; quaternary ammonium salt-containing polymerizable unsaturated monomers, such as 2-(methacryloyloxy)ethyl trimethylammonium chloride and 2-(methacryloyloxy)ethyl trimethylammonium bromide; quaternary ammonium chloride carboxy-containing polymerizable unsaturated monomers; etc.

Examples of the other polymerizable unsaturated monomers include $C_1$-$C_{24}$ alkyl or cycloalkyl esters of acrylic acid or methacrylic acid, such as methyl (meth)acrylate, ethyl (meth)acrylate, n- or isopropyl (meth)acrylate, n-, iso, or tert-butyl (meth)acrylate, 2-ethylhexyl (meth)acrylate, cyclohexyl (meth)acrylate, lauryl (meth)acrylate, and isobornyl (meth)acrylate; hydroxyalkyl esters of acrylic acid or methacrylic acid, such as 2-hydroxyethyl (meth)acrylate, 2- or 3-hydroxypropyl (meth)acrylate, and 4-hydroxybutyl (meth)acrylate; glycidyl (meth)acrylate, acrylonitrile, acrylamide, styrene, vinyl toluene, vinyl acetate, vinyl chloride, 1,6-hexanediol diacrylate, etc. These can be used singly or in a combination of two or more.

The copolymerization of the monomer mixture is not particularly limited, and can be performed by a known method. For example, solution polymerization or the like can be used for the water-soluble acrylic resin, and emulsion polymerization or the like can be used for the acrylic resin particles.

When the aqueous acrylic resin (B) is particularly a dispersoid (acrylic resin particles) of an acrylic resin emulsion obtained by emulsion polymerization, it may be multilayered particles of emulsion obtained by multi-stage emulsion polymerization of a monomer mixture in the presence of water and an emulsifier.

Acid groups, such as carboxyl groups, derived from the hydrophilic group-containing polymerizable unsaturated monomer in the aqueous acrylic resin (B) may be neutralized with a basic substance, as desired. The basic substance that can be used in this case is preferably water-soluble. Examples include ammonia, methylamine, ethylamine, propylamine, butylamine, dimethylamine, trimethylamine, triethylamine, ethylenediamine, morpholine, methylethanolamine, dimethylethanolamine, diethanolamine, triethanolamine, diisopropanolamine, 2-amino-2-methylpropanol, and the like. These can be used singly or in a combination of two or more.

The aqueous acrylic resin desirably contains a hydroxyl group. In terms of water dispersibility or compatibility with other components, the curability of the resulting coating film, etc., the aqueous acrylic resin preferably has a hydroxy value of generally 20 to 200 mgKOH/g, and particularly 20 to 150 mgKOH/g. Moreover, the aqueous acrylic resin preferably has an acid value of generally 1 to 100 mgKOH/g, and particularly 10 to 70 mgKOH/g.

Aqueous Polyester Resin

The aqueous polyester resin includes those obtained by neutralizing oil-free or oil-modified polyester resins prepared by an esterification reaction of polyhydric alcohols with polybasic acids, optionally using monobasic acids, oil components (including their fatty acids), etc.

Further usable as the polyester resin are those obtained by reacting monoepoxy compounds, such as α-olefin epoxides (e.g., propylene oxide and butylene oxide) and Cardura E10 (trade name, produced by Hexion Specialty Chemicals; glycidyl ester of a synthetic highly branched saturated fatty acid), etc., with the acid group of the polyester resin.

Moreover, the aqueous polyester resin may be modified with urethane.

The polyester resin can have a weight average molecular weight of about 3000 to 100000, and preferably 5000 to 30000. The weight average molecular weight of the polyester resin can be measured in the same manner as for the weight average molecular weight of the acrylic resin described above.

Examples of polyhydric alcohols include ethylene glycol, diethylene glycol, propylene glycol, butanediol, pentanediol, hexanediol, 2,2-dimethylpropanediol, glycerol, trimethylolpropane, pentaerythritol, ethylene oxide adducts of bisphenol compounds, propylene oxide adducts of bisphenol compounds, etc. These can be used singly or in a combination of two or more. Examples of polybasic acids include phthalic acid, isophthalic acid, tetrahydrophthalic acid, hexahydrophthalic acid, maleic acid, succinic acid, adipic acid, sebacic acid, trimellitic acid, pyromellitic acid, anhydride thereof, and the like. These can be used singly or in a combination of two or more. Examples of monobasic acids include benzoic acid, t-butyl benzoic acid, etc. Examples of oil components include castor oil, dehydrated castor oil, safflower oil, soybean oil, linseed oil, tall oil, coconut oil, fatty acids of these oils, etc. These can be used singly or in a combination of two or more.

When a carboxyl group is introduced into the polyester resin, the introduction can be carried out, for example, by the combined use of polybasic acids having 3 or more carboxyl groups per molecule, such as trimellitic acid and pyromellitic acid, and/or anhydrides thereof, or by adding dicarboxylic acid by half esterification.

Moreover, when a hydroxyl group is introduced, the introduction can be easily carried out, for example, by the combined use of polyhydric alcohols having 3 or more hydroxyl groups per molecule, such as glycerol and trimethylolpropane.

The carboxyl groups of the polyester resin can be neutralized with a basic substance mentioned above, if necessary.

The aqueous polyester resin preferably contains a hydroxyl group. In terms of water dispersibility or compatibility with other components, and the curability of the resulting coating film, etc., the aqueous polyester resin preferably has a hydroxy value of generally 20 to 200 mgKOH/g, and particularly 20 to 150 mgKOH/g. Moreover, the aqueous polyester resin preferably has an acid value of generally 1 to 100 mgKOH/g, and particularly 10 to 70 mgKOH/g.

In the present invention, the rate of the aqueous dispersion (A) to the resin (B) used is preferably in the range of generally 5/95 to 80/20, particularly 10/90 to 75/25, and more particularly 15/85 to 75/25, as the solids mass ratio of component (A)/component (B). If this ratio is outside of the above range, the adhesion of the resulting coating film to materials, water resistance, etc., may be reduced.

The aqueous coating composition of the present invention may also contain, if necessary, aqueous resins other than the aqueous dispersion of a modified polyolefin (A) and the aqueous acrylic resin and/or aqueous polyester resin (B). Specific examples include urethane resins, epoxy resins, etc.

Such optionally usable resins other than the components (A) and (B) also preferably have a hydroxyl group as a crosslinking functional group, in terms of coating composition resin compositions (e.g., acrylic melamine resin, acrylic isocyanate resin, etc.) generally widely used as coating compositions for vehicles. Among the above resins, aqueous urethane resins can be particularly preferably used.

Aqueous Urethane Resin

The aqueous urethane resin is a water-soluble or water-dispersible resin having a urethane bond in the molecule. The form of the resin in an aqueous medium may be any of a water-soluble type, a colloidal dispersion type, an emulsion type, and a slurry type. A colloidal dispersion type or an emulsion type is preferable.

As the aqueous urethane resin, those that are known per se can be used. Preferred aqueous urethane resins include those prepared, for example, by subjecting polyurethane obtained by reacting a polyol, such as polyester polyol, polycarbonate polyol, or polyether polyol, with polyisocyanate, to chain extension optionally in the presence of a chain extender that is a low-molecular compound having at least two active hydrogen atoms per molecule, such as diol or diamine. They can be used while stably dispersed or dissolved in an aqueous medium.

Examples of the polyester polyol used in the production of the aqueous urethane resin include polyester diols obtained by reacting aliphatic diols, such as 1,4-butanediol and 1,6-hexanediol, with aliphatic dicarboxylic acids, such as adipic acid and sebacic acid; polyester diols obtained by reacting such aliphatic diols with aromatic dicarboxylic acids, such as terephthalic acid; and the like. Examples of the polycarbonate polyol include polycarbonate diols obtained by reacting diols, such as 1,6-hexanediol and 3-methyl-1,5-pentanediol, with carbonate compounds, such as dimethyl carbonate, etc. Examples of the polyether polyol include polyalkylene glycols obtained by ring-opening polymerization of ethylene oxide, propylene oxide, etc.

Examples of the polyisocyanate include aliphatic and alicyclic diisocyanates, such as hexamethylene diisocyanate, dicyclohexylmethane diisocyanate, isophorone diisocyanate, and hydrogenated xylylene diisocyanate; and isocyanurate ring adducts thereof.

Further, examples of the diol used as a chain extender include ethylene glycol, 1,4-butanediol, 1,5-pentanediol, 3-methyl-1,5-pentanediol, cyclohexanediol, and the like. Examples of diamines include ethylenediamine, propylenediamine, xylylenediamine, and the like.

The aqueous urethane resin can be stably dispersed or dissolved in water, for example, by the following methods.

(1) a method in which carboxyl groups are introduced into polyurethane by using a carboxy-containing diol, such as dimethylolpropionic acid or dimethylolbutanoic acid, as a raw material for producing urethane, and some or all of the carboxyl groups are neutralized to thereby impart hydrophilicity to the polyurethane; and the polyurethane is dispersed or dissolved in water by self-emulsification.

(2) a method in which water-soluble polyurethane is produced using a hydrophilic polyol, such as polyethylene glycol, as a polyol, which is a raw material for producing urethane, and the polyurethane is dispersed or dissolved in water.

(3) a method in which a polyurethane that has completed reaction or a polyurethane whose terminal isocyanate group is blocked with a blocking agent, such as oxime, alcohol, phenol, mercaptan, amine, or sodium bisulfite, is forcibly dispersed in water using an nonionic and/or cationic emulsifier and mechanical shear force.

(4) a method in which an isocyanate-terminated urethane prepolymer is mixed with water, an emulsifier, and a chain extender; and the mixture is dispersed using mechanical shear force while increasing the molecular weight.

The aqueous polyurethane resin is not limited to those obtained by a single production method, and mixtures of polyurethanes obtained by various methods can also be used.

When such an aqueous urethane resin is used, the amount thereof used is preferably in the range of generally 1 to 40 mass %, and particularly 5 to 35 mass %, based on the total solids mass of the aqueous dispersion of a modified polyolefin (A) and the aqueous acrylic resin and/or aqueous polyester resin (B) in the aqueous coating composition, in to/ms of finish etc.

Phosphoric Acid Compound (C)

The phosphoric acid compound (C) is represented by Formula (1) below:

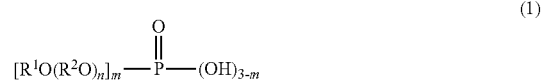

(1)

wherein m is 1 or 2, n is 0 or an integer of 1 to 20,
$R^1$ is substituted or unsubstituted hydrocarbon having 2 or more and 20 or less carbon atoms,
when m is 2, each $R^1$ may be the same or different,
$R^2$ is $C_{2-4}$ alkylene,
when n is 2 or more, n number of oxyalkylene units ($R^2O$) may be the same or different, wherein when they are different, the addition of $(R^2O)_n$ may be random-addition, block-addition, or alternate addition, and
when m is 2, each $(R^2O)_n$ may be the same or different.

The phosphoric acid compound (C) having the structure of the above Formula (1) has a phosphate group and a hydrocarbon group, and preferably further has a (poly)oxyalkylene group. This compound has the action as an acid compound derived from the phosphate group, and also has the action as a surfactant due to the combined use of the phosphate group, which is a hydrophilic group (preferably a (poly)oxyalkylene group, which is a nonionic group), and the hydrocarbon group, which is a hydrophobic group.

Due to the characteristics as a surfactant, the phosphoric acid compound (C) has excellent emulsifiability for the aqueous dispersion of a modified polyolefin (A) and the aqueous acrylic resin and/or aqueous polyester resin (B) of the aqueous coating composition of the present invention.

This results in wettability, viscosity development, and like effects; thus, the aqueous coating composition of the present invention has excellent storage stability and an excellent finished appearance (smoothness and distinctness of image).

Further, the phosphate group contributes to the adhesion to plastic base materials. Moreover, in the case of an aqueous coating composition in which the aqueous dispersion of a modified polyolefin (A) and the aqueous acrylic resin and/or aqueous polyester resin (B) have a hydroxyl group as a crosslinking functional group, and the composition comprises a crosslinking agent, such as melamine resin, whose reactivity is promoted by an acid catalyst, the acid catalyst effect of the phosphate group improves curability. Accordingly, a coating film also having excellent performance, such as water resistance, can be obtained.

In Formula (1) above, $R^1$ is substituted or unsubstituted hydrocarbon. In terms of the appearance (e.g., distinctness of image and flip flop) and water resistance of the resulting coating film, $R^1$ is preferably hydrocarbon having 2 to 20 carbon atoms, more preferably 4 to 20 carbon atoms, even more preferably 7 to 20 carbon atoms, and particularly preferably 7 to 16 carbon atoms.

The hydrocarbon group is preferably linear or branched alkyl, and particularly preferably branched alkyl. Examples of $C_{2-20}$ linear or branched alkyl include ethyl, n-propyl, isopropyl, n-butyl, isobutyl, sec-butyl, tert-butyl, n-pentyl, n-hexyl, 2-ethylbutyl, 3-methylpentyl, 1,2-dimethylbutyl, n-heptyl, 2-ethylpentyl, 3-ethylpentyl, 1,4-dimethylpentyl, 2-methyl-1-isopropylpropyl, 1-ethyl-3-methylbutyl, n-octyl, 4-ethylhexyl, 3-methyl-1-isopropylbutyl, 2-methyl-1-isopropylbutyl, 3,4,4-trimethylpentyl, 1,5-dimethylhexyl, n-nonyl, 2-ethylheptyl, 3,5,5-trimethylhexyl, 1,6-dimethylheptyl, n-decyl, 2-ethyloctyl, 4-ethyloctyl, 3,6,6-trimethylheptyl, 1,7-dimethyloctyl, n-undecyl, 2-ethylnonyl, 3,7,7-trimethyloctyl, 1,8-dimethylnonyl, n-dodecyl, 2-ethyldecyl, 3,8,8-trimethylnonyl, 1,9-dimethyldecyl, n-tridecyl, 2-ethylundecyl, 3,9,9-trimethyldecyl, 1,10-dimethylundecyl, n-tetradecyl, 2-ethyldodecyl, 3,10,10-trimethylundecyl, 1,11-dimethyldodecyl, n-pentadecyl, 2-ethyltridecyl, 3,11,11-trimethyldodecyl, 1,12-dimethyltridecyl, n-hexadecyl, 2-ethyltetradecyl, 3,12,12-trimethyltridecyl, 1,13-dimethyltetradecyl, n-heptadecyl, 2-ethylpentadecyl, 3,13,13-trimethyltetradecyl, 1,14-dimethylpentadecyl, n-octadecyl, 2-ethylhexadecyl, 3,14,14-trimethylpentadecyl, 1,15-dimethylhexadecyl, n-nonadecyl, 2-ethylheptadecyl, 3,15,15-trimethylhexadecyl, 1,16-dimethylheptadecyl, n-icosyl, 2-ethyloctadecyl, 3,16,16-trimethylheptadecyl, 1,17-dimethyloctadecyl, and the like. Of these, $R^1$ in Formula (1) is particularly preferably $C_{7-20}$ branched alkyl.

When $R^1$ is branched alkyl, a coating film having excellent distinctness of image can be formed, even when the present coating composition is applied after being stored for a relatively long period of time.

When $R^1$ is substituted hydrocarbon, examples of substituents include halogen (e.g., fluorine, chlorine, bromine, etc.), alkenyl (e.g., $C_{2-6}$ alkenyl having 1 or 2 carbon-carbon double bonds, such as vinyl, allyl, 2-butenyl, 3-butenyl, 2-pentenyl, 1,3-pentadienyl, and 2-hexenyl), aryl (e.g., $C_{6-16}$ aryl, such as phenyl, naphthyl, biphenyl, anthracenyl, phenanthryl, and pyrenyl), alkoxy (e.g., $C_{1-6}$ alkoxy, such as methoxy, ethoxy, n-propoxy, isopropoxy, n-butoxy, isobutoxy, sec-butoxy, tert-butoxy, n-pentyloxy, n-hexyloxy, 2-ethylbutoxy, 3-methylpentyloxy, and 1,2-dimethylbutoxy), and the like.

The phosphoric acid compound (C) can be obtained by, for example, reacting a phosphorylating agent, such as orthophosphoric acid, phosphorus pentaoxide (anhydrous phosphoric acid), polyphosphoric acid, or phosphorus oxychloride, with an alcohol or an alcohol alkylene oxide adduct obtained by addition reaction of an alkylene oxide to an alcohol.

The reaction of a phosphorylating agent with an alcohol or an alcohol alkylene oxide adduct can be performed by a known method. In that case, the alcohol and alcohol alkylene oxide adduct may be independently used singly or in a combination of two or more.

The phosphoric acid compound (C) represented by Formula (1) is generally obtained as a mixture of a monoester and a diester.

Examples of alcohols include ethanol, propanol, isopropanol, butanol, isobutanol, pentanol, hexanol, 2-ethylbutanol, 3-methylpentanol, cyclohexyl alcohol, heptanol, 2-ethylpentanol, 3-ethylpentanol, octanol, 2-ethylhexanol, 4-ethylhexanol, nonyl alcohol, 2-ethylheptanol, decanol, 2-ethyloctanol, 4-ethyloctanol, dodecanol, hexadecanol, octadecanol, and the like.

Preferred among these are alcohols having $C_{7-20}$ alkyl, such as heptanol, 2-ethylpentanol, 3-ethylpentanol, octanol, 2-ethylhexanol, 4-ethylhexanol, nonyl alcohol, 2-ethylheptanol, decanol, 2-ethyloctanol, 4-ethyloctanol, dodecanol, hexadecanol, and octadecanol; and particularly preferred are alcohols having $C_{7-20}$ branched alkyl, such as 2-ethylpentanol, 3-ethylpentanol, 2-ethylhexanol, 4-ethylhexanol, 2-ethylheptanol, 2-ethyloctanol, and 4-ethyloctanol.

Examples of alkylene oxides include $C_{2-4}$ alkylene oxides, such as ethylene oxide, propylene oxide, and butylene oxide. These can be used singly or in a combination of two or more. Of these, ethylene oxide can be preferably used. Therefore, in Formula (1), examples of the oxyalkylene unit ($R^2O$) include oxyethylene, oxypropylene, oxybutylene, etc. A plurality of oxyalkylene units may be the same or different. Moreover, the oxyalkylene unit ($R^2O$) is preferably oxyethylene, etc.

In Formula (1), n is the addition mole number of alkylene oxide. n is preferably 1 to 20, more preferably 1 to 10, and even more preferably 1 to 5. In a preferred embodiment, the phosphoric acid compound (C) may be a mixture of a phosphoric acid compound represented by Formula (1) wherein n is 0, and a phosphoric acid compound represented by Formula (1) wherein n is an integer of 1 to 20.

The number average molecular weight of the phosphoric acid compound (C) is preferably 100 to 3000, more preferably 100 to 2500, and even more preferably 100 to 2000. The molecular weight of the phosphoric acid compound (C) can be calculated based on information of the molecular weight of the raw materials used and the synthesis conditions. Moreover, the average molecular weight of the phosphoric acid compound (C) can be measured in the same manner as described above regarding the water-soluble acrylic resin (B).

The HLB value of the phosphoric acid compound (C) is preferably 3 to 17, more preferably 3 to 15, and even more preferably 4 to 13.

If the HLB value is less than 3, hydrophilicity is low and emulsification ability is weak; therefore, the stability of the coating composition, smoothness, distinctness of image, etc., may be insufficient.

If the HLB value exceeds 17, hydrophilicity is overly high; therefore, the water resistance of the resulting coating film may be reduced, and popping resistance during coating may be reduced.

The HLB value is a value expressing the degree of affinity of surfactants with water and oil (organic compounds insoluble in water). HLB is an acronym for Hydrophile-Lipophile Balance.

In the present invention, the HLB value is calculated using the following Griffin equation based on a mass fraction:

$$HLB=20(MH/M)$$

wherein MH represents the molecular weight of the hydrophilic group moiety, and M represents the molecular weight of the compound (surfactant).

In the present invention, the HLB value of the phosphoric acid compound (C) is defined as the HLB value of a non-ionic compound used as a raw material in the production of the phosphoric acid compound (C).

Specifically, as described above regarding the production of the phosphoric acid compound (C), the phosphoric acid compound (C) is obtained by reacting a phosphorylating agent with an alcohol or an alcohol alkylene oxide adduct. The HLB value of the phosphoric acid compound (C) of the present invention refers to the HLB value of the alcohol alkylene oxide adduct among the raw materials for producing the phosphoric acid compound (C). In this case, if the alcohol, which is a raw material of the alcohol alkylene oxide adduct, is water-soluble, the HLB value cannot be calculated.

The phosphoric acid compound (C) may be used singly or in a combination of two or more. Moreover, the phosphoric acid compound (C) may be a commercial product or a synthesized product.

The amount of the phosphoric acid compound (C) is preferably 0.1 to 10 mass %, more preferably 0.3 to 7 mass %, and even more preferably 0.5 to 5 mass %, based on the total solids content of the components (A) and (B).

Crosslinking Agent (D)

The coating composition of the present invention may contain, if necessary, a crosslinking agent (D), in terms of the curability of the coating composition and the coating film performance, such as water resistance, of the resulting coating film.

The crosslinking agent is not particularly limited. A crosslinking agent that is reactive with the crosslinking reactive groups of the aqueous dispersion of a modified polyolefin (A) and the aqueous acrylic resin and/or aqueous polyester resin (B) can be used, depending on the crosslinking reactive groups.

Specific examples of the crosslinking agent (D) include amino resins, polyisocyanate compounds, polyhydrazide compounds, polysemicarbazide compounds, carbodiimide group-containing compounds, oxazoline group-containing compounds, epoxy compounds, polycarboxylic acids, and the like. The curing agents may be used singly or in a combination of two or more.

As the resin composition of coating compositions for vehicles, the combination of hydroxy-containing resins, such as acrylic resins, and crosslinking agents that are reactive with the hydroxyl groups of such resins are generally widely used, in terms of the finished appearance and coating film performance. Thus, among the above crosslinking agents, amino resins and polyisocyanate compounds can particularly be preferably used.

Examples of usable amino resins include partially or fully methylolated amino resins obtained by reacting amino components with aldehyde components. Examples of amino components include melamine, urea, benzoguanamine, acetoguanamine, steroguanamine, spiroguanamine, dicyandiamide, and the like. Examples of aldehyde components include formaldehyde, paraformaldehyde, acetaldehyde, benzaldehyde, and the like.

The methylolated amino resins in which some or all of the methylol groups have been etherified with suitable alcohols are also usable. Examples of alcohols that can be used for the etherification include methyl alcohol, ethyl alcohol, n-propyl alcohol, i-propyl alcohol, n-butyl alcohol, i-butyl alcohol, 2-ethyl-1-butanol, 2-ethyl-1-hexanol, and the like.

Preferred amino resins are melamine resins. Particularly preferred are a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl mixed etherified melamine resin obtained by etherifying some or all of the methylol groups of a partially or fully methylolated melamine resin with methyl alcohol and butyl alcohol. A methyl-butyl mixed etherified melamine resin is more preferable.

The weight average molecular weight of the melamine resin is preferably 400 to 6,000, more preferably 500 to 4,000, and even more preferably 600 to 3,000.

A commercially available product can be used as the melamine resin. Examples of commercially available products include "Cymel 202," "Cymel 203," "Cymel 204," "Cymel 211," "Cymel 212," "Cymel 238," "Cymel 251," "Cymel 253," "Cymel 254," "Cymel 303," "Cymel 323," "Cymel 324," "Cymel 325," "Cymel 327," "Cymel 350," "Cymel 370," "Cymel 380," "Cymel 385," "Cymel 1156," "Cymel 1158," "Cymel 1116," and "Cymel 1130" (all produced by Nihon Cytec Industries Inc.); "Resimene 735," "Resimene 740," "Resimene 741," "Resimene 745," "Resimene 746," and "Resimene 747" (all produced by Monsanto Co., Ltd.); "U-Van 120," "U-Van 20HS," "U-Van 20SE," "U-Van 2021," "U-Van 2028," and "U-Van 28-60" (all produced by Mitsui Chemicals, Inc.); "SUMIMAL M55," "SUMIMAL M30W," and "SUMIMAL M50W" (all produced by Sumitomo Chemical Co., Ltd.); and the like.

When a melamine resin is used, a sulfonic acid, such as paratoluenesulfonic acid, dodecylbenzenesulfonic acid, or dinonylnaphthalenesulfonic acid; a neutralization salt of such a sulfonic acid with amine; a neutralization salt of a phosphoric ester compound with amine; or the like may be used as a curing catalyst.

Polyisocyanate compounds have two or more isocyanate groups per molecule.

Specific examples of polyisocyanate compounds include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethyl caproate; aliphatic triisocyanates, such as lysine ester triisocyanate, 1,4,8-triisocyanateoctane, 1,6,11-triisocyanateundecane, 1,8-diisocyanato-4-isocyanatomethyloctane, 1,3,6-triisocyanatehexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, and norbornane diisocyanate; alicyclic triisocyanates, such as 1,3,5-triisocyanatecyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanates include aromatic-aliphatic diisocyanates, such as 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, and 4,4'-diphenylether diisocyanate; aromatic triisocyanates, such as triphenylmethane-4,4',4''-triisocyanate, 1,3,5-triisocyanatobenzene, and 2,4,6-triisocyanatotoluene; aromatic tetraisocyanates, such as diphenylmethane-2,2',5,5'-tetraisocyanate; and the like.

Examples of polyisocyanate derivatives include dimers, trimers, biurets, allophanates, carbodiimides, uretdiones, urethoimines, isocyanurates, oxadiazinetriones, polymethylene polyphenyl polyisocyanates (crude MDI, polymeric MDI), crude TDI, and the like of polyisocyanate compounds mentioned above.

Further, usable polyisocyanate compounds are blocked polyisocyanate compounds obtained by blocking free isocyanate groups of polyisocyanate compounds with a blocking agent. When a blocked polyisocyanate compound is heated to, for example, 100° C. or more, preferably 130° C. or more, the isocyanate groups are regenerated and can readily react with reactive groups.

Examples of such blocking agents include phenol-based blocking agents, such as phenol, cresol, xylenol, nitrophenol, ethylphenol, hydroxydiphenyl, butylphenol, isopropylphenol, nonylphenol, octylphenol, and hydroxymethyl benzoate; lactam-based blocking agents; such as ε-caprolactam, δ-valerolactam, γ-butyrolactam, and β-propiolactam; aliphatic alcohol-based blocking agents, such as methanol, ethanol, propyl alcohol, butyl alcohol, amyl alcohol, and lauryl alcohol; ether-based blocking agents, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; benzyl alcohol; glycolic acid; glycolates, such as methyl glycolate, ethyl glycolate, and butyl glycolate; lactic acid; lactates, such as methyl lactate, ethyl lactate, and butyl lactate; alcohol-based blocking agents, such as methylol urea, methylol melamine, diacetone alcohol, 2-hydroxyethyl acrylate, and 2-hydroxyethyl methacrylate; oxime-based blocking agents, such as formamidoxime, acetamidooxime, acetoxime, methylethylketoxime, diacetyl monoxime, benzophenone oxime, and cyclohexaneoxime; active methylene-based blocking agents, such as dimethyl malonate, diethyl malonate, ethyl acetoacetate, methyl acetoacetate, and acetylacetone; mercaptan-based blocking agents, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based blocking agents, such as acetanilide, acetanisidide, acetotoluide, acrylamide, methacrylamide, acetamide, stearamide, and benzamide; imide-based blocking agents, such as succinimide, phthalimide, and maleimide; amine-based blocking agents, such as diphenylamine, phenylnaphthylamine, xylidine, N-phenylxylidine, carbazole, aniline, naphthylamine, butylamine, dibutylamine, and butylphenylamine; imidazole-based blocking agents, such as imidazole and 2-ethylimidazole; pyrazole-based blocking agents, such as 3,5-dimethylpyrazole; urea-based blocking agents, such as urea, thiourea, ethylene urea, ethylene thiourea, and diphenylurea; carbamate-based blocking agents, such as phenyl N-phenylcarbamate; imine-based blocking agents, such as ethyleneimine and propyleneimine; sulfite salt-based blocking agents, such as sodium bisulfite and potassium bisulfite; and other blocking agents.

When a polyisocyanate compound is used, an organic tin compound or the like can be used as a curing catalyst.

Polyisocyanate compounds can be used as crosslinking agents, for example, for resins containing a hydroxyl or amino group.

Polyhydrazide compounds have two or more hydrazide groups per molecule.

Examples of polyhydrazide compounds include saturated aliphatic carboxylic acid dihydrazides having 2 to 18 carbon atoms, such as oxalic acid dihydrazide, malonic acid dihydrazide, succinic acid dihydrazide, glutaric acid dihydrazide, adipic acid dihydrazide, and sebacic acid dihydrazide; dihydrazides of monoolefinic unsaturated dicarboxylic acids, such as maleic acid dihydrazide, fumaric acid dihydrazide, and itaconic acid dihydrazide; polyhydrazides of carbonic acids, such as carbonic acid dihydrazide; polyhydrazides of aromatic polycarboxylic acids, such as dihydrazides of phthalic acid, terephthalic acid, or isophthalic acid, and dihydrazide, trihydrazide, or tetrahydrazide of pyromellitic acid; aliphatic trihydrazides, such as nitrilotriacetic acid trihydrazide, citric acid trihydrazide, and 1,2,4-benzene trihydrazide; tetrahydrazides, such as ethylenediaminetetraacetic acid tetrahydrazide and 1,4,5,8-naphthoic acid tetrahydrazide; polyhydrazides obtained by reacting a low polymer having a carboxylic acid lower alkyl ester group with hydrazine or hydrazine hydrate (see JPS52-22878B); and the like.

A polyhydrazide compound with overly high hydrophobicity makes dispersion in water difficult, and a uniform crosslinked coating film cannot be obtained. Thus, it is preferable to use a compound with moderate hydrophilicity having a relatively low molecular weight (about 300 or less). Examples of such polyhydrazide compounds include dihydrazide compounds of $C_4$-$C_{12}$ dicarboxylic acids, such as succinic acid dihydrazide, glutaric acid dihydrazide, adipic acid dihydrazide, and sebacic acid dihydrazide.

Polyhydrazide compounds can be used as crosslinking agents, for example, for resins containing a carbonyl group.

Polysemicarbazide compounds have two or more semicarbazide groups per molecule.

Examples of polysemicarbazide compounds include aliphatic, alicyclic, or aromatic bissemicarbazides; polyfunctional semicarbazides obtained by reacting diisocyanates, such as hexamethylene diisocyanate or isophorone diisocyanate, or polyisocyanate compounds derived therefrom, with excess N,N-substituted hydrazines, such as N,N-dimethylhydrazine, and/or hydrazides mentioned above; aqueous polyfunctional semicarbazides obtained by reacting isocyanate groups of reaction products of polyisocyanate compounds mentioned above, polyether, and active hydrogen compounds containing a hydrophilic group, such as polyol compounds or polyethylene glycol monoalkyl ether compounds, with excess dihydrazides mentioned above (see, for example, JPH08-151358A); compounds having a semicarbazide group, such as mixtures of polyfunctional semicarbazides mentioned above and aqueous polyfunctional semicarbazides mentioned above; compounds having a hydrazone group, such as bisacetyl dihydrazone; and the like.

Polysemicarbazide compounds can be used as crosslinking agents, for example, for resins containing a carbonyl group.

Carbodiimide group-containing compounds are obtained, for example, by reacting isocyanate groups of polyisocyanate compounds with each other to remove carbon dioxide.

Examples of corresponding commercially available products include "Carbodilite V-02," "Carbodilite V-02-L2," "Carbodilite V-04," "Carbodilite E-01," and "Carbodilite E-02" (trade names, all produced by Nisshinbo Industries, Inc.).

Carbodiimide group-containing compounds can be used as crosslinking agents, for example, for resins containing a carboxyl group.

Examples of oxazoline group-containing compounds include (co)polymers obtained by copolymerizing polymers having an oxazoline group, such as polymerizable unsaturated monomers having an oxazoline group, optionally with other polymerizable unsaturated monomers by a known method (e.g., solution polymerization, emulsion polymerization, etc.).

Examples of polymerizable unsaturated monomers having an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, and the like.

Examples of other polymerizable unsaturated monomers include $C_{1-24}$ alkyl or cycloalkyl esters of (meth)acrylic acid, such as methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, and isobornyl (meth)acrylate; $C_{2-8}$ hydroxyalkyl esters of (meth)acrylic acid, such as 2-hydroxyethyl (meth)acrylate and hydroxypropyl (meth)acrylate; vinyl aromatic compounds, such as styrene and vinyl toluene; adducts of (meth)acrylamide, dimethylaminopropyl (meth)acrylamide, dimethylaminoethyl (meth)acrylate, or glycidyl (meth)acrylate with amine compounds; polyethylene glycol (meth) acrylate; N-vinyl pyrrolidone, ethylene, butadiene, chloroprene, vinyl propionate, vinyl acetate, (meth)acrylonitrile, and the like. These can be suitably selected singly or in a combination of two or more.

Oxazoline group-containing compounds can be used as crosslinking agents, for example, for resins containing a carboxyl group.

Epoxy compounds have two or more epoxy groups per molecule. Specific examples include diepoxy compounds, such as bis(3,4-epoxycyclohexylmethyl)adipate, epoxy group-containing acrylic resins, and the like.

Epoxy compounds can be used as crosslinking agents, for example, for resins containing an acid or amino group.

Examples of polycarboxylic acids include aliphatic polybasic acids, such as adipic acid, azelaic acid, sebacic acid, 1,4-cyclohexanedicarboxylic acid, 1,2-cyclohexanedicarboxylic acid, 1,2,4-butanetricarboxylic acid, and 1,2,3,4-butanetetracarboxylic acid; aromatic polybasic acids, such as phthalic acid, isophthalic acid, terephthalic acid, and trimellitic acid; half-esters produced by addition reaction of polyol and 1,2-acid anhydride; addition reaction product of polyepoxide and 1,2-acid anhydride in an amount of 2 equivalents or more relative to the epoxy groups of the polyepoxide; carboxy-containing acrylic polymers; acrylic polymers having a group obtained by half-esterification of an acid anhydrous group; carboxy-containing polyester-based polymers; and the like.

Polycarboxylic acid can be used as crosslinking agents, for example, for epoxy or carbodiimide group-containing resins.

When an amino resin or a polyisocyanate compound mentioned above is used as the crosslinking agent (D), the amount thereof used is preferably in the range of generally 1 to 50 mass %, and particularly 5 to 30 mass %, based on the total solids mass of the aqueous dispersion of a modified polyolefin (A), and the aqueous acrylic resin and/or aqueous polyester resin (B) in the aqueous coating composition.

Aqueous Coating Composition

The amounts of the aqueous dispersion of a modified polyolefin (A), the aqueous acrylic resin and/or aqueous polyester resin (B), the phosphoric acid compound (C), and the crosslinking agent (D) in the aqueous coating composition of the present invention are as follows. Based on the total resin solids content of the components (A), (B), and (D) (when an optionally used resin, other than the components (A) and (B), is contained, including the resin), the amount of the aqueous dispersion of a modified polyolefin (A) is 1 to 60 mass %, preferably 5 to 50 mass %, and more preferably 10 to 40 mass %; the amount of the aqueous acrylic resin and/or aqueous polyester resin (B) is 1 to 80 mass %, preferably 3 to 70 mass %, and more preferably 5 to 60 mass %; the amount of the crosslinking agent (D) is 0 to 60 mass %, preferably 0 to 40 mass %, and more preferably 5 to 30 mass %; and the amount of the phosphoric acid compound (C) is 0.1 to 10 mass %, preferably 0.3 to 7 mass %, and more preferably 0.5 to 5 mass %.

The aqueous coating composition of the present invention can be prepared by, for example, mixing the aqueous dispersion of a modified polyolefin (A), the aqueous acrylic resin and/or aqueous polyester resin (B), and the phosphoric acid compound (C) by a general method, and suitably diluting the mixture with an aqueous medium, such as deionized water.

The appropriate viscosity may vary depending on the formulation of the coating composition, but is generally in the range of about 20 to 60 seconds, and preferably about 25 to 50 seconds, as adjusted and measured at 20° C. using Ford cup viscometer No. 4. Moreover, in the above, the coating solids concentration of the present coating composition is generally about 5 to 70 mass %, and preferably about 10 to 50 mass %.

The aqueous coating composition of the present invention may contain a conductive pigment, for the purpose of imparting conductivity to plastic base materials. The conductive pigment is not particularly limited, as long as it can impart conductivity to the resulting coating film. Examples include pigments in the form of particles, flakes, and fibers (including whiskers). Specific examples of the conductive pigment include conductive carbon, such as conductive carbon black, carbon nanotubes, carbon nanofibers, and carbon microcoils; and powder of metal, such as silver, nickel, copper, graphite, and aluminum. Examples further include antimony-doped tin oxide, phosphorus-doped tin oxide, acicular titanium oxide whose surface is coated with tin oxide/antimony, antimony oxide, zinc antimonate, indium tin oxide, carbon or graphite whiskers whose surface is coated with tin oxide; flaky mica pigments whose surface is coated with at least one conductive metal oxide selected from the group consisting of tin oxide, antimony-doped tin oxide, tin-doped indium oxide (ITO), fluorine-doped tin oxide (FTC), phosphorus-doped tin oxide, and nickel oxide; and conductive pigments of titanium dioxide particles containing tin oxide and phosphorus on their surfaces.

These conductive pigments may be used singly or in a combination of two or more. Of these conductive pigments, conductive carbon is preferably used.

In tetras of the conductivity and the adhesion, water resistance, etc., of the resulting coating film, the content of the conductive pigment is preferably in the range of generally 1 to 300 mass %, particularly 2 to 250 mass %, and more particularly 3 to 180 mass %, based on the total solids mass of the aqueous dispersion of a modified polyolefin (A) and the aqueous acrylic resin and/or aqueous polyester resin (B) in the aqueous coating composition. In particular, when conductive carbon is used, the amount thereof is preferably in the range of generally 1 to 30 mass %, particularly 2 to 25 mass %, and more particularly 3 to 25 mass %, based on the total solids mass of the aqueous dispersion of a modified polyolefin (A) and the aqueous acrylic resin and/or aqueous polyester resin (B) in the aqueous coating composition.

The aqueous coating composition of the present invention may contain, if necessary, pigments other than the above conductive pigments. Examples of other pigments include color pigments, such as titanium oxide, red oxide, aluminium paste, azo pigment, and phthalocyanine pigment; and extender pigments, such as talc, silica, calcium carbonate, barium sulfate, and zinc white (zinc oxide). These can be used singly or in a combination of two or more.

The aqueous coating composition of the present invention may contain, if necessary, additives for coating compositions, such as a curing catalyst, a thickener, an antifoaming agent, an organic solvent, a surface control agent, etc.

The aqueous coating composition of the present invention can be applied to the surface of a plastic base material, as described above. Examples of plastic base materials include polyolefins produced by (co)polymerizing one or more $C_2$-$C_{10}$ olefin compounds, such as ethylene, propylene, butylene, and hexene. In addition, the aqueous coating composition of the present invention can also be applied to polycarbonate, ABS resin, urethane resin, polyamide, etc. Examples of molded products formed from the above materials include plastic molded products used in vehicle exterior panels (e.g., bumpers, spoilers, grilles, and fenders), electrical home appliance exterior panels, etc.

The surface of such a plastic base material can be suitably subjected to degreasing, water washing, etc., by a known method prior to coating of the aqueous coating composition of the present invention.

The aqueous coating composition of the present invention is preferably applied by air spraying, airless spraying, dip coating, brushing, or the like, to the surface of a plastic base material so that the dry film thickness is generally 1 to 20 μm, and preferably 3 to 11 μm. After coating of the aqueous coating composition, the obtained coating film can be subjected to, if necessary, setting at room temperature for about 30 seconds to 60 minutes, preliminary heating (preheating) at a temperature of about 40 to 80° C. for about 1 to 60 minutes, or curing by heating at a temperature of about 60 to 140° C., and preferably about 70 to 120° C., for about 20 to 40 minutes.

The primer coating film formed from the aqueous coating composition may have conductivity. It is preferable that the surface resistivity of the primer coating film (cured coating film) is generally $1 \times 10^8 \Omega/\square$ or less, and particularly $1 \times 10^7 \Omega/\square$ or less. This enables excellent electrostatic coating as a conducting primer coating film in the subsequent step.

The "surface resistivity" (unit: $\Omega/\square$) can be measured, for example, in such a manner that a coating film applied to a dry film thickness of about 15 μm is dried at 80° C. for 10 minutes, and the surface resistivity is measured using a TREK surface resistivity meter (trade name: "TREK MODEL 150").

One or more top coating compositions may be subsequently electrostatically applied to the primer coating film formed from the aqueous coating composition of the present invention. As such a top coating composition, a colored coating composition may be singly applied. Alternatively, the colored coating composition may be used as a base coating composition, and the base coating composition and a clear coating composition may be sequentially applied. Further, on the primer coating film, for example, a white base coating composition and an interference pearl base coating composition may be sequentially applied as colored base coating layers to form a multilayer film.

Known colored coating compositions can be used. In general, colored coating compositions comprising an organic solvent and/or water as a main solvent; coloring components, such as a color pigment, an effect pigment, and a dye; and resin components, such as a base resin and a crosslinking agent, can be used.

Examples of the base resin used in the colored coating composition include acrylic resins, polyester resins, alkyd resins, and like resins that have a reactive functional group, such as a hydroxyl group, an epoxy group, a carboxyl group, and a silanol group. Examples of the crosslinking agent include amino resins (e.g., melamine resin and urea resin), (blocked) polyisocyanate compounds, polyepoxide, polycarboxylic acid, and the like that have a reactive functional group reactive with these functional groups.

The colored coating composition may contain, if necessary, additives for coating compositions, such as an extender pigment, a curing catalyst, an ultraviolet absorber, a coating-surface controlling agent, a rheology control agent, an antioxidant, an antifoaming agent, a wax, a preservative, etc.

The colored coating composition can be electrostatically applied to the uncured or cured primer coating film to a dry film thickness of generally 5 to 50 μm, preferably 5 to 30 μm, and more preferably 10 to 20 μm. The obtained film surface can be subjected, if necessary, to setting at room temperature for about 1 to 60 minutes, preheating at a temperature of about 40 to 80° C. for about 1 to 60 minutes, or curing by heating at a temperature of about 60 to 140° C., preferably about 80 to 120° C., for 20 to 40 minutes.

In the present invention, clear coating is particularly preferably performed without curing the colored base coating composition after coating thereof.

Examples of the clear coating composition include organic solvent-based, water-based, or powder-based thermosetting coating compositions containing a base resin, a crosslinking agent, and like resin components, an organic solvent, water, etc., and optionally containing additives for coating compositions, such as an ultraviolet absorber, a light stabilizer, a curing catalyst, a coating-surface controlling agent, a rheology control agent, an antioxidant, an antifoaming agent, a wax, etc., and having transparency such that a lower layer coating film is visible through a clear coating film to be formed.

Further, the clear coating composition may contain a color pigment, an effect pigment, a dye, etc., if necessary, as long as the transparency is not impaired. The clear coating composition may further suitably contain an extender pigment, a thickener, an anticorrosive, and the like.

Examples of the base resin include acrylic resins, polyester resins, alkyd resins, fluororesins, urethane resins, silicone-containing resins, and like resins that contain at least one reactive functional group, such as a hydroxyl group, a carboxyl group, a silanol group, and an epoxy group. Particularly, hydroxy-containing acrylic resins are preferred. Examples of the crosslinking agent include melamine resins, urea resins, (blocked) polyisocyanate compounds, epoxy compounds, carboxy-containing compounds, acid anhydrides, alkoxysilane group-containing compounds, and the like that have a reactive functional group reactive with these functional groups. Particularly, polyisocyanate compounds are preferred.

Preferred as the clear coating composition among these are thermosetting coating compositions comprising a hydroxy-containing resin and a blocked or unblocked polyisocyanate compound.

The clear coating composition may be a one-component coating composition, or a two-component coating composition, such as a two-component urethane resin coating composition.

The clear coating composition can be electrostatically applied to the uncured or cured colored base coating film to a dry film thickness of generally 10 to 50 μm, preferably 20 to 40 μm. The obtained film surface can be subjected, if necessary, to setting at room temperature for about 1 to 60 minutes, preheating at a temperature of about 40 to 80° C. for about 1 to 60 minutes, or curing by heating at a temperature of about 60 to 140° C., preferably about 70 to 120° C., for about 20 to 40 minutes.

A plastic molded product in which a colored base coating film and a clear coating film are applied to a primer coating film can be obtained in the above manner.

As described above, the coating composition of the present invention is coated by applying it to a substrate, followed by curing. Therefore, the present invention also provides an article having a coating film obtained by curing the coating composition of the present invention (e.g., vehicles and parts thereof).

EXAMPLES

The present invention is described in further detail below with reference to Examples and Comparative Examples. However, the present invention is not limited to only these Examples. Note that "parts" and "%" are expressed on a mass basis.
Production of Aqueous Coating Composition Aqueous Primer Example 1

30 parts (as solids mass) of an aqueous dispersion of a modified polyolefin (A1) (Note 1), 45 parts (as solids mass) of an aqueous acrylic resin (B1) (Note 4), 25 parts (as solids mass) of a melamine resin (D1) (Note 10), 20 parts of conductive pigment (F1) (Note 12), 80 parts of titanium white (Note 13), and 2 parts of a phosphoric acid compound (C1) (Note 14) were mixed by a general method. The mixture was then diluted with deionized water to a solids concentration of 40%, thereby obtaining an aqueous primer (X1).

Examples 2 to 34 and Comparative Examples 1 to 5

Aqueous primers (X2) to (X39) were each obtained in the same manner as in Example 1, except that the formulation of Example 1 was changed as shown in Table 1.

Although it is not shown in Table 1, all of the aqueous primers (X1) to (X39) contain 20 parts of the conductive pigment (F1) and 80 parts of titanium white (Note 13).

The formulation of Table 1 is expressed on a solids mass basis, and each component of Table 1 is as described below.

(Note 1) Aqueous dispersion of a modified polyolefin (A1): An aqueous dispersion prepared by neutralizing a modified polyolefin having a melting point of 80° C., a Mw of about 100,000, and Mw/Mn of about 2.1 obtained by adding 8 mass % of maleic acid to an ethylene-propylene copolymer (ethylene content: 5%) obtained by using a metallocene-based catalyst, with an equivalent amount of dimethylethanolamine, and dispersing the resultant in water using 10 parts of emulsifier per 100 parts of the polypropylene/ethylene copolymer.

Note that Mw and Mn represent weight average molecular weight and number average molecular weight, respectively.

(Note 2) Aqueous dispersion of a modified polyolefin (A2): "Hardlen NA-3002," an aqueous dispersion of a non-chlorinated polyolefin, produced by Toyobo Co., Ltd., trade name, solids concentration: 30%

(Note 3) Aqueous dispersion of a modified polyolefin (A3): "EH-801," an aqueous dispersion of a chlorinated polyolefin, produced by Toyobo Co., Ltd., trade name, degree of chlorination: 16%, solids concentration: 30%

(Note 4) Aqueous acrylic resin (B1): "Bayhydrol XP2427," hydroxy-containing acrylic resin emulsion, produced by Sumika Bayer Urethane Co., Ltd., trade name (Note 5) Aqueous acrylic resin (B2): An acrylic resin solution produced in the following manner.

35 parts of propylene glycol monomethyl ether and 25 parts of propylene glycol monobutyl ether were placed in a reactor equipped with a thermometer, a thermostat, a stirrer, a reflux condenser, and a dropping funnel. The content was stirred while heating, and maintained at 110° C. A mixture of 15 parts of "NF Bisomer S20W" (trade name, produced by Dai-Ichi Kogyo Seiyaku Co, Ltd., methoxy polyethylene glycol monomethacrylate), 10 parts of 2-hydroxyethyl acrylate, 30 parts of methyl methacrylate, 15 parts of n-butyl acrylate, 5 parts of styrene, 20 parts of isobornyl acrylate, 5 parts of acrylic acid, 1 part of azobisisobutyronitrile, and 20 parts of propylene glycol monomethyl ether was added dropwise to the reactor over 3 hours.

After completion of the dropwise addition, the content was aged at 110° C. for 30 minutes. Then, an additional catalyst mixture of 15 parts of propylene glycol monomethyl ether and 0.5 parts of azobisisobutyronitrile was added dropwise to the reactor over 1 hour. Subsequently, the content was aged at 110° C. for 1 hour, and then cooled, thereby obtaining a solution of an acrylic resin (B2) having a solids concentration of 50%.

(Note 6) Aqueous acrylic resin (B3): An acrylic resin emulsion produced in the following manner.

130 parts of deionized water and 0.52 parts of Aqualon KH-10 (a polyoxyethylene alkyl ether sulfate ester ammonium salt, produced by Dai-ichi Kogyo Seiyaku Co., Ltd.; active ingredient: 97%) were placed in a reactor equipped with a thermometer, a thermostat, a stirrer, a reflux condenser, and a dropping funnel. The mixture was stirred and mixed in a nitrogen stream, and heated to 80° C. Subsequently, 1% of the total amount of a monomer emulsion 1 described below and 5.3 parts of a 6% ammonium persulfate aqueous solution were introduced into the reactor, and maintained at 80° C. for 15 minutes. The rest of the monomer emulsion 1 was then added dropwise to the reactor over 3 hours while the reactor was maintained at the same temperature. After completion of the dropwise addition, the mixture was aged for 1 hour. Thereafter, a monomer emulsion 2 described below was added dropwise over 1 hour, and the mixture was aged for 1 hour. Then, while 40 parts of a 5% dimethylethanolamine aqueous solution was gradually added to the reactor, the mixture was cooled to 30° C., and filtered through a 100-mesh nylon cloth to obtain an acrylic resin emulsion (B3) having an average particle size of 100 nm (as measured at 20° C. using a "COULTER N4" submicron particle size distribution analyzer (produced by Beckman Coulter, Inc.) in a state diluted with deionized water), a solids concentration of 30%, an acid value of 33 mgKOH/g, a hydroxy value of 25 mgKOH/g, and an average particle size of 120 nm (as measured at 20° C. using a "COULTER N4" submicron particle size distribution analyzer (produced by Beckman Coulter, Inc.) in a state diluted with deionized water).

Monomer emulsion 1: The monomer emulsion 1 was obtained by mixing and stirring 42 parts of deionized water, 0.72 parts of "Aqualon KH-10," 2.1 parts of methylenebis acrylamide, 2.8 parts of styrene, 16.1 parts of methyl methacrylate, 28 parts of ethyl acrylate, and 21 parts of n-butyl acrylate.

Monomer emulsion 2: The monomer emulsion 2 was obtained by mixing and stirring 18 parts of deionized water, 0.31 parts of "Aqualon KH-10," 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate.

(Note 7) Aqueous polyester resin: A polyester resin solution produced in the following manner.

105 parts of neopentyl glycol, 273 parts of trimethylolpropane, 320 parts of butylethylpropanediol, 219 parts of adipic acid, and 385 parts of isophthalic acid were placed in a reactor equipped with a thermometer, a thermostat, a stirrer, a reflux condenser, and a water separator. After the temperature was increased from 160° C. to 220° C. over 3 hours, the content was subjected to a condensation reaction at 220° C. for 4 hours while removing the produced condensed water by the water separator.

Subsequently, in order to add carboxyl groups to the resulting condensation reaction product, 76 parts of trimellitic anhydride was further added to the reactor, and allowed to react at 170° C. for 30 minutes. Then, 5.5 parts of dimethylethanolamine and 120 parts of deionized water were added to the reactor while stirring, thereby obtaining a solution of an aqueous polyester resin (B4) having a solids concentration of 70%. The resulting hydroxy-containing polyester resin had an acid value of 35 mgKOH/g, a hydroxy value of 140 mgKOH/g, and a number average molecular weight of 5,000.

(Note 8) Aqueous acrylic resin: An acrylic resin solution produced in the following manner.

35 parts of propylene glycol monopropyl ether was placed in a flask, and heated to 85° C. Then, a mixture of 43 parts of methyl methacrylate, 20 parts of 2-ethylhexyl acrylate, 29 parts of n-butyl acrylate, 2 parts of hydroxyethyl acrylate, 6 parts of acrylic acid, 15 parts of propylene glycol monopropyl ether, and 1.1 parts of 2,2'-azobis(2,4-dimethylvaleronitrile) was added dropwise to the flask over 4 hours. After completion of the dropwise addition, the mixture was aged for 1 hour. Thereafter, a mixture of 10 parts of propylene glycol monopropyl ether and 1 part of 2,2'-azobis(2,4-dimethylvaleronitrile) was further added dropwise to the flask over 1 hour. After completion of the dropwise addition, the mixture was aged for 1 hour. Further, 7.4 parts of diethanolamine was added, thereby obtaining a water-soluble acrylic resin (B5) having a solids concentration of 55%, an acid value of 47 mgKOH/g, and a hydroxy value of 10 mgKOH/g.

(Note 9) Aqueous polyurethane resin (other resin E1): "U-COAT UX-310," trade name, produced by Sanyo Chemical Industries, Ltd., aqueous urethane emulsion (Note 10) Melamine resin (crosslinking agent D1): "Cymel 325," trade name, produced by Nihon Cytec Industries Inc.

(Note 11) Blocked polyisocyanate compound (crosslinking agent D2): "Bayhydur VPLS2310," trade name, produced by Sumika Bayer Urethane Co., Ltd., solids content: 38%

(Note 12) Conductive pigment (F1): "Balkan XC72," trade name, produced by Cabot Specialty Chemicals, Inc., conductive carbon black pigment (Note 13) Titanium white: "JR-806," trade name, produced by Tayca Corporation (Note 14) Phosphoric acid compound (C1): in Formula (1), $R^1$ is $C_3$ linear alkyl, $R^2$ is ethylene, and n is 1; number average molecular weight: 227, HLB: 15 or more (an estimated value, because it cannot be calculated by the Griffin method). Note that m is 1 or 2, and the ratio of the monoester wherein m is 1 and the diester wherein m is 2 is 1:1.

The phosphoric acid compounds (C2) to (C21) shown in Table 1 below are as follows. Note that in Formula (1) of all of the phosphoric acid compounds (C2) to (C21), m is 1 or 2, and the ratio of the monoester wherein m is 1 and the diester wherein m is 2 is 1:1.

(Note 15) Phosphoric acid compound (C2): in Formula (1), $R^1$ is $C_3$ branched alkyl, $R^2$ is ethylene, and n is 1; number average molecular weight: 227, HLB: 15 or more (an estimated value, because it cannot be calculated by the Griffin method)

(Note 16) Phosphoric acid compound (C3): in Formula (1), $R^1$ is $C_6$ linear alkyl, $R^2$ is ethylene, and n is 1; number average molecular weight: 290, HLB: 6.0

(Note 17) Phosphoric acid compound (C4): in Formula (1), $R^1$ is $C_6$ branched alkyl, $R^2$ is ethylene, and n is 1; number average molecular weight: 290, HLB: 6.0.

(Note 18) Phosphoric acid compound (C5): in Formula (1), $R^1$ is $C_7$ linear alkyl, $R^2$ is ethylene, and n is 1; number average molecular weight: 311, HLB: 5.5

(Note 19) Phosphoric acid compound (C6): in Formula (1), $R^1$ is $C_7$ branched alkyl, $R^2$ is ethylene, and n is 1; number average molecular weight: 311, HLB: 5.5

(Note 20) Phosphoric acid compound (C7): in Formula (1), $R^1$ is $C_8$ linear alkyl, $R^2$ is ethylene, and n is 1; number average molecular weight: 332, HLB: 5.1

(Note 21) Phosphoric acid compound (C8): in Formula (1), $R^1$ is $C_8$ branched alkyl, $R^2$ is ethylene, and n is 1; number average molecular weight: 332, HLB: 5.1

(Note 22) Phosphoric acid compound (C9): in Formula (1), $R^1$ is $C_9$ linear alkyl, $R^2$ is ethylene, and n is 1; number average molecular weight: 353, HLB: 4.7

(Note 23) Phosphoric acid compound (C10): in Formula (1), $R^1$ is $C_9$ branched alkyl, $R^2$ is ethylene, and n is 1; number average molecular weight: 353, HLB: 4.7

(Note 24) Phosphoric acid compound (C11): in Formula (1), $R^1$ is $C_{12}$ linear alkyl, $R^2$ is ethylene, and n is 1; number average molecular weight: 482, HLB: 6.4

(Note 25) Phosphoric acid compound (C12): in Formula (1), $R^1$ is $C_{18}$ linear alkyl, $R^2$ is ethylene, and n is 1; number average molecular weight: 674, HLB: 6.6

(Note 26) Phosphoric acid compound (C13): in Formula (1), R is $C_7$ branched alkyl, and n is 0; number average molecular weight: 245, HLB: 5 or less (an estimated value, because it cannot be calculated by the Griffin method)

(Note 27) Phosphoric acid compound (C14): in Formula (1), $R^1$ is $C_7$ branched alkyl, $R^2$ is ethylene, and n is 3; number average molecular weight: 443, HLB: 10.6

(Note 28) Phosphoric acid compound (C15): in Formula (1), $R^1$ is $C_7$ branched alkyl, $R^2$ is ethylene, and n is 5; number average molecular weight: 575, HLB: 13.1

(Note 29) Phosphoric acid compound (C16): in Formula (1), $R^1$ is $C_7$ branched alkyl, $R^2$ is ethylene, and n is 10; number average molecular weight: 905, HLB: 15.8

(Note 30) Phosphoric acid compound (C17): in Formula (1), $R^1$ is $C_8$ branched alkyl, and n is 0; number average molecular weight 266, HLB: 5 or less (an estimated value, because it cannot be calculated by the Griffin method)

(Note 31) Phosphoric acid compound (C18): in Formula (1), $R^1$ is $C_8$ branched alkyl, $R^2$ is ethylene, and n is 3; number average molecular weight: 464, HLB: 10.1

(Note 32) Phosphoric acid compound (C19): in Formula (1), $R^1$ is $C_8$ branched alkyl, $R^2$ is ethylene, and n is 5; number average molecular weight: 596, HLB: 12.6

(Note 33) Phosphoric acid compound (C20): in Formula (1), $R^1$ is $C_1$ linear alkyl, $R^2$ is ethylene, and n is 1; number average molecular weight: 185, HLB: 15 or more (an estimated value, because it cannot be calculated by the Griffin method)

(Note 34) Phosphoric acid compound (C21): in Formula (1), $R^1$ is $C_{21}$ linear alkyl, $R^2$ is ethylene, and n is 7; number average molecular weight: 1001, HLB: 9.9.

(Note 35) Polyol A (polyethylene glycol, solids content: 100%, hydroxy value: 187, number average molecular weight: about 600)

(Note 36) Polyol B (polyester polyol, solids content: 100%, hydroxy value: 235, number average molecular weight: about 480)

TABLE 1

| | Name of aqueous primer | Aqueous dispersion of modified polyolefin (A) | | Aqueous acrylic resin (B) and other resin | | | | Crosslinking agent (D) | | Phosphoric acid compound (C) | | | | | | |
|---|---|---|---|---|---|---|---|---|---|---|---|---|---|---|---|---|
| | | | | resin (B) | | Aqueous polyester and/or other resin (E) | | | | R1 | | R2 | | | | |
| | | Type | Amount | Type | Amount | Type | Amount | Type | Amount | Type | Number of carbons | Structure | Number of carbons | n | Average molecular weight | HLB | Amount |
| Examples | | | | | | | | | | | | | | | | | |
| 1 | X1 | A1 | 30 | B1 | 45 | | | D1 | 25 | C1 | 3 | Linear | 2 | 1 | 227 | 15 or more | 2 |
| 2 | X2 | A1 | 30 | B1 | 45 | | | D1 | 25 | C2 | 3 | Branched | 2 | 1 | 227 | 15 or more | 2 |
| 3 | X3 | A1 | 30 | B1 | 45 | | | D1 | 25 | C3 | 6 | Linear | 2 | 1 | 290 | 6.0 | 2 |
| 4 | X4 | A1 | 30 | B1 | 45 | | | D1 | 25 | C4 | 6 | Branched | 2 | 1 | 290 | 6.0 | 2 |
| 5 | X5 | A1 | 30 | B1 | 45 | | | D1 | 25 | C5 | 7 | Linear | 2 | 1 | 311 | 5.5 | 2 |
| 6 | X6 | A1 | 30 | B1 | 45 | | | D1 | 25 | C6 | 7 | Branched | 2 | 1 | 311 | 5.5 | 1 |
| 7 | X7 | A1 | 30 | B1 | 45 | | | D1 | 25 | C6 | 7 | Branched | 2 | 1 | 311 | 5.5 | 2 |
| 8 | X8 | A1 | 30 | B1 | 45 | | | D1 | 25 | C6 | 7 | Branched | 2 | 1 | 311 | 5.5 | 4 |
| 9 | X9 | A1 | 30 | B1 | 45 | | | D1 | 25 | C7 | 8 | Linear | 2 | 1 | 332 | 5.1 | 2 |
| 10 | X10 | A1 | 30 | B1 | 45 | | | D1 | 25 | C8 | 8 | Branched | 2 | 1 | 332 | 5.1 | 2 |
| 11 | X11 | A1 | 30 | B1 | 45 | | | D1 | 25 | C9 | 9 | Linear | 2 | 1 | 353 | 4.7 | 2 |
| 12 | X12 | A1 | 30 | B1 | 45 | | | D1 | 25 | C10 | 9 | Branched | 2 | 1 | 353 | 4.7 | 2 |
| 13 | X13 | A1 | 30 | B1 | 45 | | | D1 | 25 | C11 | 12 | Linear | 2 | 1 | 482 | 6.4 | 2 |
| 14 | X14 | A1 | 30 | B1 | 45 | | | D1 | 25 | C12 | 18 | Linear | 2 | 1 | 674 | 6.6 | 2 |
| 15 | X15 | A1 | 30 | B1 | 45 | | | D1 | 25 | C13 | 7 | Branched | 2 | 3 | 245 | 5 or less | 2 |
| 16 | X16 | A1 | 30 | B1 | 45 | | | D1 | 25 | C14 | 7 | Branched | 2 | 3 | 443 | 10.6 | 2 |
| 17 | X17 | A1 | 30 | B1 | 45 | | | D1 | 25 | C15 | 7 | Branched | 2 | 5 | 575 | 13.1 | 2 |
| 18 | X18 | A1 | 30 | B1 | 45 | | | D1 | 25 | C16 | 7 | Branched | 2 | 10 | 905 | 15.8 | 2 |
| 19 | X19 | A1 | 30 | B1 | 45 | | | D1 | 25 | C17 | 8 | Branched | 2 | 0 | 266 | 5 or less | 2 |
| 20 | X20 | A1 | 30 | B1 | 45 | | | D1 | 25 | C18 | 8 | Branched | 2 | 3 | 464 | 10.1 | 2 |
| 21 | X21 | A1 | 30 | B1 | 45 | | | D1 | 25 | C19 | 8 | Branched | 2 | 5 | 596 | 12.6 | 2 |
| 22 | X22 | A1 | 30 | B1 | 45 | | | D1 | 25 | C6 | Blend of C6 and C13 (1/1) | | | | | | 2 |
| 23 | X23 | A1 | 30 | B1 | 45 | | | D1 | 25 | C6 | Blend of C13 and C14 (1/1) | | | | | | 2 |
| 24 | X24 | A1 | 30 | B1 | 45 | | | D1 | 25 | C6 | Blend of C8 and C17 (1/1) | | | | | | 2 |
| 25 | X25 | A2 | 30 | B1 | 45 | | | D1 | 25 | C6 | 7 | Branched | 2 | 1 | 311 | 5.5 | 2 |
| 26 | X26 | A3 | 30 | B1 | 45 | | | D1 | 25 | C6 | 7 | Branched | 2 | 1 | 311 | 5.5 | 2 |
| 27 | X27 | A1 | 30 | B1 | 25 | B2 | 20 | D1 | 25 | C6 | 7 | Branched | 2 | 1 | 311 | 5.5 | 2 |
| 28 | X28 | A1 | 30 | B3 | 25 | B2 | 20 | D1 | 25 | C6 | 7 | Branched | 2 | 1 | 311 | 5.5 | 2 |
| 29 | X29 | A1 | 30 | B1 | 45 | | | D1 | 25 | C6 | 7 | Branched | 2 | 1 | 311 | 5.5 | 2 |
| 30 | X30 | A1 | 30 | B4 | 25 | B2 | 20 | D1 | 25 | C6 | 7 | Branched | 2 | 1 | 311 | 5.5 | 2 |
| 31 | X31 | A1 | 30 | B4 | 35 | E1 | 10 | D1 | 25 | C6 | 7 | Branched | 2 | 1 | 311 | 5.5 | 2 |
| 32 | X32 | A1 | 40 | B5 | 60 | | | D1 | 25 | C6 | 7 | Branched | 2 | 1 | 311 | 5.5 | 2 |
| 33 | X33 | A1 | 30 | B1 | 45 | | | D2 | 30 | C6 | 7 | Branched | 2 | 1 | 311 | 5.5 | 2 |
| 34 | X34 | A1 | 20 | B1 | 50 | | | D1 | 25 | C6 | 7 | Branched | 2 | 1 | 311 | 5.5 | 2 |
| Comparative Examples | | | | | | | | | | | | | | | | | |
| 1 | X35 | A1 | 30 | B1 | 45 | | | D1 | 25 | Polyol A | | | | | 600 | | 2 |
| 2 | X36 | A1 | 30 | B1 | 45 | | | D1 | 25 | Polyol B | | | | | 480 | | 2 |
| 3 | X37 | A1 | 30 | B1 | 45 | | | D1 | 25 | C20 | 1 | Linear | 2 | 1 | 185 | 15 or more | 2 |
| 4 | X38 | A1 | 30 | B1 | 45 | | | D1 | 25 | C21 | 21 | Linear | 2 | 7 | 1001 | 9.9 | 2 |
| 5 | X39 | A1 | 30 | B1 | 45 | | | D1 | 25 | C6 | 7 | Branched | 2 | 1 | 311 | 5.5 | 2 |

Examples 35 to 68 and Comparative Examples 6 to 10

Production of Test Panel

The aqueous primers (X1) to (X39) were each sprayed to a black polypropylene plate (degreased; hereinafter also abbreviated as "PP plate") to a dry film thickness of about 10 μm, and allowed to stand at room temperature for 3 minutes. As a colored base coating composition, "WBC710 metallic base" (trade name, produced by Kansai Paint Co., Ltd., aqueous metallic colored base coating composition) was electrostatically applied thereto to a dry film thickness of about 15 μm. The PP plate was preheated at 80° C. for 5 minutes. As a clear coating composition, "SFX7172 clear" (trade name, produced by Kansai Paint Co., Ltd., acrylic urethane-based solvent-based clear coating composition) was electrostatically applied thereto to a dry film thickness of about 30 μm. The PP plate was subjected to setting for 10 minutes, and heated and dried at 120° C. for 30 minutes. 39 types of test panels were produced in this manner.

Evaluation Test

The test panels obtained in Examples 35 to 68 and Comparative Examples 6 to 10 were each evaluated by the following test method. Table 2 below shows the evaluation results.

TABLE 2

| | | Name of aqueous primer | Test results | | | |
|---|---|---|---|---|---|---|
| | | | Smoothness | Distinctness of image | | Water resistance |
| | | | | Initial | After storage | |
| Examples | 35 | X1 | 9.5 | 12.5 | 16.6 | A |
| | 36 | X2 | 9.8 | 11.4 | 14.8 | A |
| | 37 | X3 | 10.1 | 9.4 | 11.9 | S |
| | 38 | X4 | 10.7 | 8.3 | 10.6 | S |
| | 39 | X5 | 11.6 | 6.1 | 10.9 | S |
| | 40 | X6 | 11.5 | 5.5 | 7.3 | A |
| | 41 | X7 | 11.2 | 5.8 | 8.3 | S |
| | 42 | X8 | 11.9 | 6.6 | 11.5 | S |
| | 43 | X9 | 10.2 | 7.4 | 11.8 | S |
| | 44 | X10 | 10.3 | 6.8 | 8.6 | S |
| | 45 | X11 | 9.7 | 8.6 | 12.7 | S |
| | 46 | X12 | 9.4 | 8.0 | 12.1 | S |
| | 47 | X13 | 8.5 | 14.0 | 17.5 | A |
| | 48 | X14 | 8.8 | 16.6 | 18.2 | A |
| | 49 | X15 | 11.8 | 6.2 | 13.0 | A |
| | 50 | X16 | 11.0 | 5.9 | 12.1 | S |
| | 51 | X17 | 11.2 | 6.7 | 11.5 | A |
| | 52 | X18 | 7.4 | 8.5 | 11.0 | A |
| | 53 | X19 | 10.0 | 7.3 | 14.5 | A |
| | 54 | X20 | 9.5 | 7.7 | 13.1 | S |
| | 55 | X21 | 9.8 | 8.5 | 12.4 | A |
| | 56 | X22 | 10.0 | 6.0 | 10.7 | S |
| | 57 | X23 | 10.9 | 6.0 | 12.4 | S |
| | 58 | X24 | 9.6 | 7.0 | 12.5 | S |
| | 59 | X25 | 9.8 | 7.1 | 10.6 | S |
| | 60 | X26 | 9.1 | 10.6 | 13.1 | S |
| | 61 | X27 | 9.4 | 5.0 | 6.0 | A |
| | 62 | X28 | 12.6 | 9.4 | 11.9 | S |
| | 63 | X29 | 8.6 | 4.7 | 5.8 | A |
| | 64 | X30 | 10.6 | 5.3 | 7.4 | A |
| | 65 | X31 | 11.0 | 5.5 | 7.9 | S |
| | 66 | X32 | 13.4 | 10.0 | 12.7 | A |
| | 67 | X33 | 9.7 | 5.2 | 6.8 | S |
| | 68 | X34 | 9.2 | 5.0 | 6.6 | A |

TABLE 2-continued

| | | Name of aqueous primer | Test results | | | |
|---|---|---|---|---|---|---|
| | | | Smoothness | Distinctness of image | | Water resistance |
| | | | | Initial | After storage | |
| Comparative Examples | 6 | X35 | 16.2 | 24.4 | 26.5 | A |
| | 7 | X36 | 15.4 | 28.0 | 29.8 | C |
| | 8 | X37 | 15.8 | 25.8 | 32.0 | C |
| | 9 | X38 | 16.1 | 22.0 | 30.1 | A |
| | 10 | X39 | 10.4 | 29.3 | 33.8 | B |

(Test Method)

For the finished appearance, smoothness and distinctness of image were evaluated in the following manner.

Smoothness: Smoothness was evaluated based on the Wc values measured using "Wave Scan DOI" (trade name, produced by BYK Gardner Co.). The Wc value is an index of the amplitude of surface roughness at a wavelength of about 1 to 3 mm. A smaller measured value indicates a higher smoothness of the coated surface.

Distinctness of image: Distinctness of image was evaluated based on the Wb values measured using "Wave Scan DOI" (trade name, produced by BYK Gardner Co.). The Wb value is an index of the amplitude of surface roughness at a wavelength of about 0.3 to 1 mm. A smaller measured value indicates a higher distinctness of image of the coated surface.

Further, storability was evaluated in such a manner that test panels were produced in the same manner as described above using the coating compositions after storage, and the distinctness of image was evaluated.

The term "initial" in the table indicates the distinctness of image when the aqueous coating compositions (aqueous primers) were applied immediately after the production thereof, and the term "after storage" indicates the distinctness of image when the aqueous coating compositions (aqueous primers) were applied after they were stored at 30° C. for 30 days after the production thereof.

A smaller difference in distinctness of image between "initial" and "after storage" indicates superior storability.

Water resistance: The test plates were immersed in warm water at 40° C. for 240 hours, removed, and dried at 20° C. for 12 hours. Subsequently, cross-cuts reaching the substrate were made in the multilayer coating film on each test plate using a cutter to form a grid of 100 squares (2 mm×2 mm). Afterwards, adhesive cellophane tape was applied to the surface of the grid portion and abruptly peeled off at 20° C. The number of the remaining coating film squares was then examined.

S: 100 squares remained, and no small edge chipping of the coating film occurred at the edge of the cut made with the cutter.

A: 100 squares remained, but small edge chipping of the coating film occurred at the edge of the cut made with the cutter.

B: 90 to 99 squares remained.

C: The number of remaining squares was 89 or less.

The invention claimed is:

1. An aqueous coating composition for vehicles, comprising:
(A) an aqueous dispersion of a modified polyolefin,
(B) an aqueous acrylic resin and/or an aqueous polyester resin, and (C) a phosphoric acid compound represented by the following Formula (1):

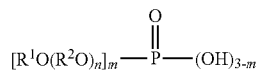 (1)

wherein m is 1 or 2, n is 0 or an integer of 1 to 20,
$R^1$ is substituted or unsubstituted hydrocarbon having 2 or more and 11 or less carbon atoms,
when m is 2, each $R^1$ may be the same or different,
$R^2$ is $C_{2-4}$ alkylene,
when n is 2 or more, n number of oxyalkylene units ($R^2O$) may be the same or different, and
when m is 2, each $(R^2O)_n$ may be the same or different, and
wherein the modified polyolefin is a polyolefin modified with an unsaturated carboxylic acid or an acid anhydride thereof.

2. The aqueous coating composition for vehicles according to claim 1, wherein the phosphoric acid compound (C) is a phosphoric acid compound represented by Formula (1) above, wherein n is an integer of 1 to 20.

3. The aqueous coating composition for vehicles according to claim 1, wherein the phosphoric acid compound (C) is a phosphoric acid compound represented by Formula (1) above, wherein the oxyalkylene unit ($R^2O$) is oxyethylene.

4. The aqueous coating composition for vehicles according to claim 1, wherein the phosphoric acid compound (C) is a phosphoric acid compound represented by Formula (1) above, wherein $R^1$ is substituted or unsubstituted hydrocarbon having 4 or more and 11 or less carbon atoms.

5. The aqueous coating composition for vehicles according to claim 4, wherein the phosphoric acid compound (C) is a phosphoric acid compound represented by Formula (1) above, wherein $R^1$ is substituted or unsubstituted hydrocarbon having 7 or more and 11 or less carbon atoms.

6. The aqueous coating composition for vehicles according to claim 1, wherein the phosphoric acid compound (C) is a phosphoric acid compound represented by Formula (1) above, wherein n is an integer of 1 to 20, and having an HLB value of 3 to 17.

7. The aqueous coating composition for vehicles according to claim 1, wherein the phosphoric acid compound (C) has a number average molecular weight of 100 to 3000.

8. The aqueous coating composition for vehicles according to claim 1, wherein the phosphoric acid compound (C) is a mixture of a phosphoric acid compound represented by Formula (1) above wherein n is 0, and a phosphoric acid compound represented by Formula (1) above wherein n is an integer of 1 to 20.

9. The aqueous coating composition for vehicles according to claim 1, further comprising a crosslinking agent (D).

10. A method for forming a coating film, the method comprising applying the aqueous coating composition for vehicles according to claim 1 to a plastic base material.

11. A method for forming a coating film, the method comprising:
applying the aqueous coating composition for vehicles according to claim 1 to a plastic base material; and
then applying one or more top coating compositions to the coated surface.

12. The method for forming a coating film according to claim 11, wherein a colored base coating composition and a clear coating composition are sequentially applied as the one or more top coating compositions.

13. An article coated with the aqueous coating composition for vehicles according to claim 1.

14. The aqueous coating composition for vehicles according to claim 1, wherein the polyolefin is obtained by (co)polymerizing at least one olefin selected from $C_{2-10}$ olefin compounds.

15. The aqueous coating composition for vehicles according to claim 14, wherein the at least one olefin is selected from the group consisting of ethylene, propylene, butylene, and hexene.

16. The aqueous coating composition for vehicles according to claim 1, wherein the unsaturated carboxylic acid or an anhydride thereof is unsaturated mono- or dicarboxylic acid or an anhydride thereof.

17. The aqueous coating composition for vehicles according to claim 1, wherein the unsaturated carboxylic acid or an anhydride thereof is (meth)acrylic acid, maleic acid, fumaric acid, or itaconic acid, or an anhydride thereof.

18. The aqueous coating composition for vehicles according to claim 1, wherein the modified polyolefin is obtained by obtaining a polyolefin by (co)polymerizing at least one olefin selected from $C_{2-10}$ olefin compounds and further graft-polymerizing the polyolefin using a $C_{3-10}$ unsaturated carboxylic acid.

* * * * *